No. 799,732. PATENTED SEPT. 19, 1905.
J. HARSEN.
VALVE.
APPLICATION FILED JAN. 8, 1903.
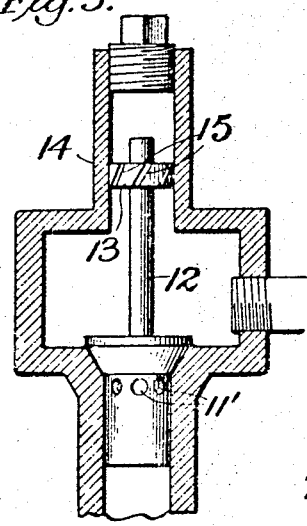
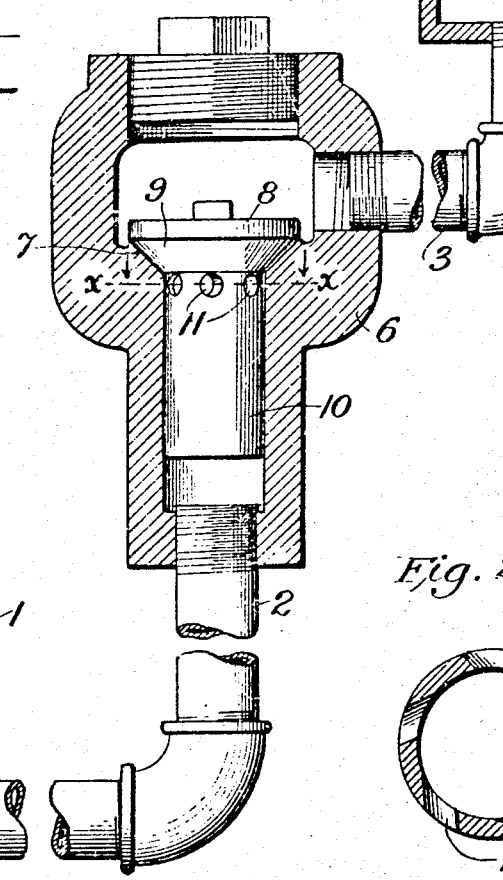
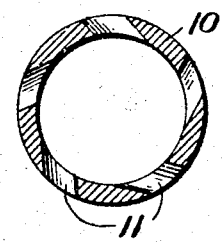
WITNESSES:
James F. Duhamel
M. P. Torney
INVENTOR,
Jacob Harsen.
BY
Emerson R. Newell
ATTORNEY

UNITED STATES PATENT OFFICE.

JACOB HARSEN, OF NEW YORK, N. Y.

VALVE.

No. 799,732.     Specification of Letters Patent.     Patented Sept. 19, 1905.

Application filed January 8, 1903. Serial No. 138,187.

*To all whom it may concern:*

Be it known that I, JACOB HARSEN, a citizen of the United States, residing at Fordham Heights, New York, State of New York, have invented certain new and useful Improvements in Valves, of which the following is a clear, full, and exact description.

My invention relates to a valve for controlling the passage of fluid; and my object is to improve and simplify the construction of the same.

It is obvious that where a check or non-return valve is used in a powerful hydraulic jack, such as with a pressure of two thousand pounds to the square inch, and when the pressure is relieved by the backward motion of the feed-pump plunger the back pressure of the water will suddenly close the check-valve and the valve will seat itself with a sudden and hammer-like blow. This soon wears out the valve, and such valves are very noisy. Furthermore, these hammer-blows of the valve often chip the valve or its seat or wear it unevenly, and the valve soon becomes leaky.

One object of my invention is to cushion the valve, so as to avoid these hammer-blows, and preferably to also rotate the valve more or less every time it is opened, so that it seats again in a relatively new place on the seat and thus insures an even wear, which will keep the valve tight.

My invention will be defined in the claims.

In the embodiments of my invention shown in the drawings, Figure 1 is a vertical section, parts being in elevation. Fig. 2 is a section of the valve on line *x x* of Fig. 1, and Fig. 3 is a modification.

1 is a reciprocating pump which forces a fluid (water preferably) through a fluid-passage formed by pipes 2 3 to a jack 4 to move the piston 5.

6 is a valve-casing, and 7 is a conical valve-seat.

8 denotes the valve as a whole and has a head 9, provided with a conical portion fitting the seat.

10 is a stem or projection carried by the valve and is preferably hollow and fits closely in the round lower part of casing 6. The upper portion of the head of this valve is not provided with any recessed portion, which would probably form back eddies and cause a staggering or choking of the pump.

In order to cushion the valve as it seats, I have provided said stem 10 with preferably several fluid-passages, through which some or all of the water passes when the valve is raised and which are relatively gradually closed as the valve approaches its seat and are entirely closed preferably just before the valve is seated. These passages may be formed in different ways; but I preferably make them in the form of holes 11, cut through said stem 10 close under said valve-head or so positioned that when the valve rises they constitute water-passages, and as the valve approaches its seat they are cut off by dropping below the lower edge of the seat. It will be obvious that as they move past this lower edge they will be closed gradually relatively to the quick movement of the valve. I have found in an actual construction in which my valve was used that even with a pressure of two thousand three hundred pounds to the square inch the valve was almost noiseless.

In order to rotate the valve when it is off its seat, I have provided a fluid-operated means which will so rotate the same. This means is preferably formed by inclined passages through which fluid passes and rotates the valve by striking against the inclined surfaces forming the sides of the passages.

In the embodiment shown in Fig. 1 the holes 11 are drilled at an incline, as shown, and as the water is forced through them it strikes the inclined sides and rotates the valve.

In Fig. 3 I have shown a modification in which the valve carries rod 12, on which is mounted a head 13, fitting in a cylindrical housing 14, and the inclined water-passages are formed by inclined slots 15 in the periphery of the head. As the valve suddenly shuts water will be forced through these passages and will rotate the valve. The holes 11 in this embodiment may be drilled radially of the axis of the valve.

I am aware that many variations from the construction illustrated may be made without departing from my invention as claimed, and I therefore do not limit myself to the embodiments herein set forth.

What I claim is—

1. In combination a reciprocating pump, a hydraulic jack, a fluid-passage connecting the same, a conical valve-seat therein, a valve having an outwardly-flaring conical head adapted to rest on said seat and close said passage, said valve having a stem fitting and sliding in said passage, said stem having one or more fluid-passages located below and close to said conical portion whereby they are closed before said valve reaches its seat to thereby cushion said valve, the upper portion of said head being free from any recess therein.

2. In combination a reciprocating pump, a hydraulic jack, a fluid-passage connecting the same, a conical valve-seat therein, a valve having an outwardly-flaring conical head adapted to rest on said seat and close said passage, said valve having a hollow stem fitting and sliding in said passage, said stem having one or more holes therein located below and close to said conical portion whereby they are closed before said valve reaches its seat to thereby cushion said valve, the upper portion of said head being free from any recess therein.

3. A valve having an outwardly-flaring conical head and a hollow stem smaller than and below said head through which water may pass, said stem having one or more holes therethrough located below and close up under said conical portion, the upper portion of said head being free from any recess therein.

4. A valve having an outwardly-flaring conical head and a hollow stem smaller than and below said head through which water may pass, said stem having one or more holes therethrough located below and close up under said conical portion, said holes passing through said stem at an angle to the radius of said stem, the upper portion of said head being free from any recess therein.

5. In combination, reciprocating pump, a hydraulic jack, a fluid-passage connecting the same, a conical valve-seat therein, a reciprocating valve having an outwardly-flaring conical portion forming a head adapted to fit said seat and close said passage, said valve being rotatable with reference to said seat, said valve having a round hollow stem smaller than said conical portion and fitting said passage below said seat, and provided with one or more inclined holes therethrough and close up under said conical portion through which fluid may pass from one side of said valve to the other, when said valve is off its seat, the upper portion of said head being free from any recess therein.

Signed at New York, N. Y., this 29th day of December, 1902.

JACOB HARSEN.

Witnesses:
   EMERSON R. NEWELL,
   M. P. TORMEY.